M. L. WELDON.
POULTRY WATER AND GRAIN RECEPTACLE.
APPLICATION FILED NOV. 7, 1907.
904,584.
Patented Nov. 24, 1908.
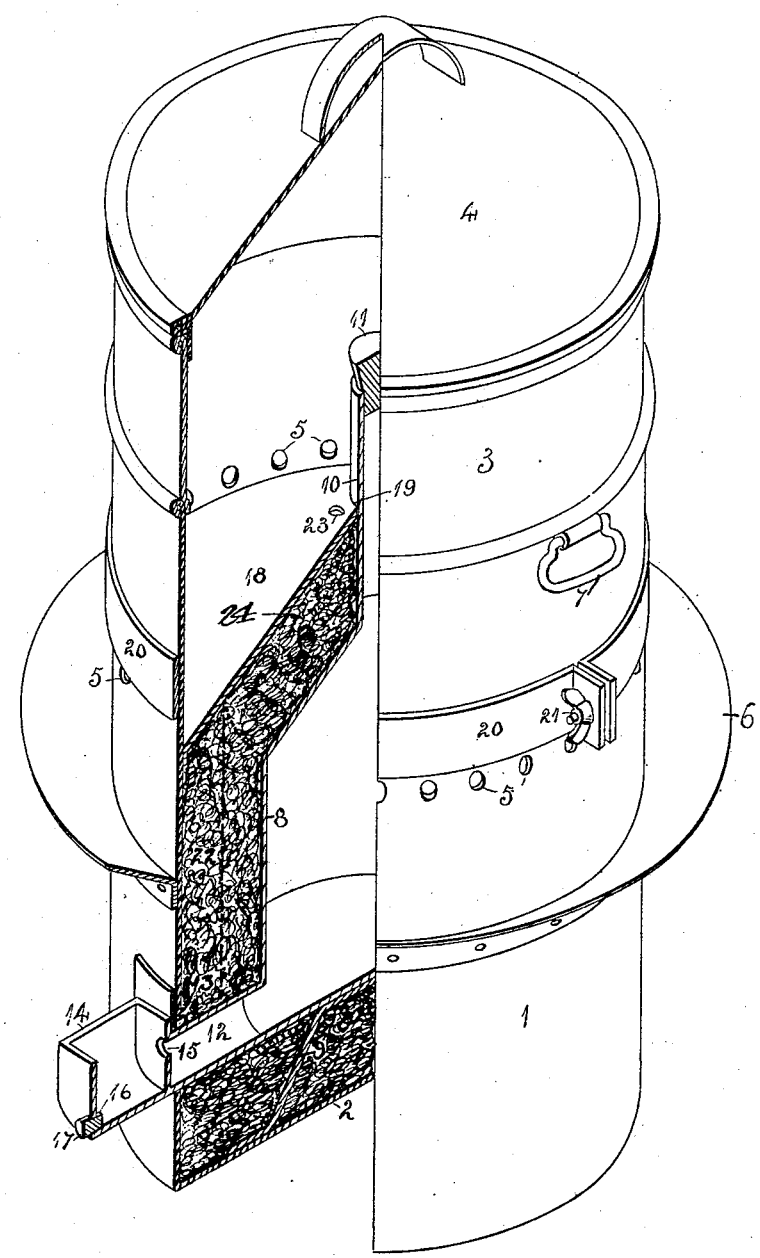
Witnesses:
E. B. Clark
E. Behel.
Inventor:
Mary Lucile Weldon.
By A. O. Behel
Atty.

UNITED STATES PATENT OFFICE.

MARY LUCILE WELDON, OF ROCKFORD, ILLINOIS.

POULTRY WATER AND GRAIN RECEPTACLE.

No. 904,584.  Specification of Letters Patent.  Patented Nov. 24, 1908.

Application filed November 7, 1907. Serial No. 401,110.

*To all whom it may concern:*

Be it known that I, MARY LUCILE WELDON, a citizen of the United States, residing at Rockford, in the county of Winnebago and State of Illinois, have invented certain new and useful Improvements in Poultry Water and Grain Receptacles, of which the following is a specification.

The object of this invention is to construct a poultry water and grain receptacle, in which the hot water will warm the grain.

In the accompanying drawings, I have shown my improved poultry water and grain receptacle in isometrical, and partly in section.

The outer casing 1 in this instance is cylindrical in form and formed with a bottom 2. An extension 3 is fitted to the top of the casing, and a cover 4 is fitted to the top of the extension, or may fit within the open end of the casing 1 when the extension is not used.

The casing 1 is formed with a series of holes or openings 5, located equi-distance from the bottom. Below the openings 5, and to the casing 1 is secured a flange 6 which extends outwardly and upwardly. Handles 7 are secured to the casing near its open end, by which the receptacle can be carried.

Within the receptacle is located a water reservoir comprising the main portion 8 resting upon the support 9 secured to the bottom of the casing. A neck 10 extends from the upper portion of the water reservoir, and a stopper 11 closes its open end. A pipe 12 communicates with the water reservoir near its bottom and extends through an opening 13 in the casing. The outer end of this pipe 12 terminates in a cup 14. An opening 15 leads from the pipe 12 into the cup and an opening 16 is formed in the cup near its bottom through which the cup may be drained. A stopper 17 is provided for the opening 16 and may be placed in the opening 15 while the cup is being drained.

Within the casing 1 is located a cone-shaped partition 18, provided with an opening 19 to receive the neck 10 of the water reservoir.

A band 20 encircles the outside of the casing 1 and may be adjusted to partly close or wholly close the openings 5 in the casing. The ends of this band are connected by the bolt and thumb-nut 21, and by means of which the band can be clamped to the casing after being adjusted.

The space 22 around the water reservoir below the partition 18 is filled with packing 24 to retain the partition in place and also to retain the heat in the water placed in the reservoir.

Grain is placed on the partition 18, which is intended to be supported by the packing placed in the space 22 and around the neck 10 of the water reservoir. The heat from the water in cooling will warm the grain and the fowls can gather the grain by picking through the openings 5, and any dropping grains will be received by the flange 6 and picked up by the fowls.

The extension top can be used or not as desired, if a greater supply of grain is wished.

The fowls can get water from the cup 14 which is always warm.

The partition 18 can be removed by inserting a hook in the opening 23.

I claim as my invention.

1. A receptacle of the class described, comprising an outer casing, a water reservoir located within the casing, a cup communicating with the reservoir, and a partition within the casing and located over the water reservoir, the casing being provided with openings located above the lower edge of the partition.

2. A receptacle of the class described, comprising an outer casing, a cone-shaped partition located within the casing, the casing being provided with openings located above the lower edge of the partition, and a band located outside of the casing to close or partially close the openings, and provided with out-turned ends which are adjustably connected.

3. A receptacle of the class described, comprising an outer casing, a water reservoir located within the casing, and having a neck portion, and a cone-shaped partition located within the casing above the reservoir and encircling the neck portion, the casing being provided with openings located above the lower edge of the partition.

In testimony whereof I have hereunto set my hand in presence of two subscribing witnesses.

MARY LUCILE WELDON.

Witnesses:
A. O. BEHEL,
W. G. WELDON.